Patented Dec. 12, 1950

2,533,351

UNITED STATES PATENT OFFICE 2,533,351

FORMATION OF GLASS FILM ON SILICON STEEL BY STRIP ANNEALING

Victor W. Carpenter, Franklin, Ohio, assignor to Armco Steel Corporation, a corporation of Ohio No Drawing. Application November 22, 1946, Serial No. 711,806

4 Claims. (Cl. 148—6.35)

This invention relates to the formation of glass film on silicon steel by strip annealing. In Patent Number 2,385,332 in the name of Carpenter, Bell and Heck and in a co-pending application of myself and Samuel A. Bell, Serial No. 606,712, filed July 23, 1945, now U. S. Patent No. 2,492,682, there are disclosed processes of forming glass-like coatings on silicon steel. Such coatings are valuable in conferring upon stock to be used for laminated cores of magnetic apparatus a high surface resistivity while at the same time maintaining a high space factor. Briefly in said patent the process involved preferentially oxidizing silicon in the sheet stock adjacent the surface thereof to form silica, coating the surface of the stock with a magnesia-bearing substance and heat treating the coated stock in a box-anneal in a very slow process. An excess of magnesia-bearing material was used to provide an annealing separator and after the glass forming step the excess magnesia was scrubbed from the surface of the stock leaving the insulative film.

In said copending application an improvement on said process is disclosed in which the stock, after being coated with magnesium hydroxide and dried, is given a further drying step at temperatures around 1500° F. to drive off the water of combination. This heat treatment may also include the decarburizing treatment. The box anneal is still used however to form the silica-magnesia glass coating, and an excess of magnesia is still used to provide an annealing separator during the high temperature box anneal.

In the treatment of extremely thin silicon steel sheet stock (and by sheet stock I mean to include material of sheet gages whether it is in the form of sheets, an endless strip or a strip formed by the welding together of sheets) problems are encountered which render the processes disclosed in said patent and said co-pending application unsuitable. It has been found to be impractical to box anneal very thin sheet stock; and by very thin I mean sheet stock of a thickness of .005 inch or less.

I have found that by the process to be disclosed herein I can develop the desired magnetic properties and produce a glass film on the surface of silicon steel in one continuous operation and that I can produce such a coating on material of a thickness of .005 inch or less by virtue of the fact that my novel process eliminates the need for a box anneal. Furthermore by the elimination of a box anneal I am enabled to reduce the amount of magnesia-bearing material used to the point where I use only a sufficient quantity to form a glass film of the desired thickness, i. e., I do not use an excess of magnesia-bearing material over the amount which will combine with the surface silica to form a glass.

It is an object of my invention, therefore, to provide a process for the production of glass coating on very thin silicon steel sheet stock which coating will be durable and have high insulative properties as well as an excellent space factor.

It is another object of my invention to provide a process for simultaneously developing desired magnetic properties and for producing such film on silicon steel sheet stock continuously and rapidly. A further object of my invention includes the elimination of the necessity for using an excess of magnesia-bearing material which object I achieve by the other object of eliminating a box anneal so that I have no need for an annealing separator.

These and other objects of my invention which will be pointed out in more detail hereinafter I accomplish by that series of steps of which I shall now describe exemplary embodiments.

Starting with cold rolled sheet stock of thin gage, I coat the stock on both sides with magnesia or a magnesia-bearing material. While various magnesia-bearing substances are satisfactory as well as the oxides and hydroxides of the other alkaline earth metals, I prefer to use magnesium hydroxide or milk of magnesia because of its cheapness and ready availability. The thickness of the coating may readily be controlled by rubber coated rolls or doctor blades and I control the thickness of the coating so as to provide on the surfaces of the stock only enough of the magnesium hydroxide to produce a glass film of the desired thickness. The coating may, of course, be accomplished by dipping or spraying or in any other desired manner.

The coated strip is then passed directly into a strip furnace either with or without previous drying. This furnace must contain a wet reducing atmosphere, which may be an atmosphere of hydrogen, dissociated ammonia or other hydrogen-bearing reducing gas. If the strip has been previously dried, it may be necessary to introduce water vapor into the furnace atmosphere, while if it is introduced wet, a sufficient amount of moisture will usually be carried in with the wet coating. In either event it is only necessary to keep the moisture content of the atmosphere at such a level that the dew point will not be less than substantially 70° F., and to keep the hydrogen and other reducing gases to such a value that the mixture will be reducing to iron in accordance with well known equilibrium relations.

The moisture in the furnace atmosphere does two things: It provides conditions necessary for decarburizing and also provides the necessary oxygen for the formation of silica. Thus the moisture in the furnace atmosphere combines with silicon at the surface of the stock to form silica ($SiO_2$). Also the milk of magnesia ($Mg(OH)_2$) breaks down into magnesia (MgO) and water which is desirable as above pointed out. The magnesia formed from the milk of magnesia then combines with the silica to form the glass film (a magnesium silicate). As pointed out hereinabove the amount of milk of magnesia is calculated to produce the amount of magnesia necessary for the formation of a glass film of the desired thickness.

It is, of course, possible to use an excess of the milk of magnesia but this will necessitate a scrubbing step after the strip anneal in order to remove the excess magnesia and since, as above pointed out, there is no need for an excess of magnesia, it is wasteful to use an excess of the milk of magnesia.

The temperature in the furnace should be maintained between substantially 1900° F. and 2200° F. I have had excellent results with the furnace maintained at 2100° F. The material may be passed through the furnace fairly rapidly. For example, I have produced an excellent glass film on a strip .002 inch in thickness by passing it at a speed of 30 feet per minute through a 10 foot hot zone at a temperature of 2100° F. so that each element of the strip is in the hot zone for about 20 seconds, but a longer time is not detrimental. The film is extremely uniform from edge to edge of the strip as well as from end to end in the coil. The strip emerging from the furnace is finished and, if no excess of milk of magnesia has been used it will not even be necessary to perform a scrubbing operation.

While the invention is probably of greatest value in connection with extremely thin stock, I have used it on stock up to .013 inch in thickness and have produced satisfactory glass film.

It is desirable, of course, that the strip be clean when being coated with milk of magnesia or other magnesia-bearing substance. However, the magnesia-bearing substance may be applied in a carrier such as a very thin oil. In such a case it is apparently unnecessary to clean the strip before coating.

It is interesting to observe that when ordinary silicon steel strip is continuously annealed in a wet atmosphere at say 2100° F. the silica particles which are formed by reaction of the silica with the water vapor coalesce beneath the surface of the strip. Such material has a negligible interlamination resistivity. The same stock coated with milk of magnesia and annealed under exactly the same conditions will have the silica particles disposed at the surface where they react with the magnesia to form the glass film. The resistivity of this surface film is comparable to that obtained by box annealing.

It will have been noted that decarburization of the strip takes place at the same time as the glass film formation so that it is unnecessary to put the material through a separate decarburizing step. The film produced is excellent as to resistivity, has a high space factor and is extremely durable. It will be clear that modifications may be made in my process without departing from the spirit of my invention, and I, therefore, do not intend to limit myself except as pointed out in the claims which follow.

Having now fully described my invention, what I claim as new and desire to secure by Letters Patent is:

1. A process of producing an insulative glass film on thin cold rolled silicon steel strip, which comprises coating said strip with a thin coating of magnesia-bearing material, and passing said strip through a hot zone at such a speed that it reaches a temperature substantially between 1900° and 2200° F. in a wet decarburizing atmosphere containing free hydrogen, said atmosphere being reducing to iron and oxidizing to silicon, whereby to oxidize silicon therein to silica at and near the strip surfaces, and to dehydrate the magnesia-bearing material and cause it to combine with said silica, the time of passage of said strip through said hot zone being such as to produce an oxidative effect on silicon therein substantially equivalent to that produced by the passage of silicon steel strip .002 in. thick through such hot zone for a time at least about 20 seconds, in which hot zone the temperature reaches 2100° F.

2. The process of claim 1 in which said magnesia-bearing material is applied in an amount sufficient only to form said glass film.

3. The process of claim 1 in which said magnesia-bearing substance is principally milk of magnesia.

4. A process of producing an insulative glass film on thin cold rolled silicon steel strip, which comprises coating said strip with a thin coating of a substance chosen from the group consisting of the oxides and hydroxides of the alkaline earth metals, and passing said strip through a hot zone at such a speed that it reaches a temperature substantially between 1900° and 2200° F. in a wet decarburizing atmosphere containing free hydrogen, said atmosphere being reducing to iron and oxidizing to silicon, whereby to oxidize silicon therein to silica at and near the strip surfaces, and to dehydrate the said coating and cause the alkaline earth metal oxide to combine with said silica, the time of passage of said strip through said hot zone being such as to produce an oxidative effect on silicon therein substantially equivalent to that produced by the passage of silicon steel strip .002 in. thick through such hot zone for a time at least about 20 seconds, in which hot zone the temperature reaches 2100° F.

VICTOR W. CARPENTER.

REFERENCES CITED

The following references are of record in the file of this patent:

UNITED STATES PATENTS

| Number | Name | Date |
|---|---|---|
| 1,842,162 | Gifford | Jan. 19, 1932 |
| 2,050,408 | Yensen | Aug. 11, 1936 |
| 2,079,494 | Dantsizen | May 4, 1937 |
| 2,110,893 | Sendzimir | May 15, 1938 |
| 2,282,163 | Burgwin | May 5, 1942 |
| 2,385,332 | Carpenter et al. | Sept. 25, 1945 |
| 2,413,949 | Broverman | Jan. 7, 1947 |